United States Patent [19]

Shu

[11] Patent Number: 5,190,104
[45] Date of Patent: Mar. 2, 1993

[54] CONSOLIDATION AGENT AND METHOD
[75] Inventor: Paul Shu, Cranbury, N.J.
[73] Assignee: Mobil Oil Corporation, Fairfax, Va.
[21] Appl. No.: 810,464
[22] Filed: Dec. 19, 1991
[51] Int. Cl.$^5$ .......................................... E21B 33/138
[52] U.S. Cl. ...................................... 166/294; 106/634; 166/292
[58] Field of Search ....................... 166/292, 294, 270; 106/600, 603, 634

[56] References Cited

U.S. PATENT DOCUMENTS

| | | | |
|---|---|---|---|
| 2,207,759 | 7/1940 | Reimers | 166/292 |
| 3,175,611 | 3/1965 | Hower | 166/292 |
| 3,437,143 | 4/1969 | Cook | 166/285 |
| 3,593,796 | 7/1971 | Stainback et al. | 166/292 X |
| 3,918,521 | 11/1975 | Snavely, Jr. et al. | 166/272 |
| 4,440,227 | 4/1984 | Holmes | 166/261 |
| 4,479,894 | 10/1984 | Chen et al. | 166/274 X |
| 4,489,783 | 12/1984 | Shu | 166/272 |
| 4,513,821 | 4/1985 | Shu | 166/273 |
| 4,549,608 | 10/1985 | Stowe et al. | 166/280 |
| 4,669,542 | 6/1987 | Venkatesan | 166/258 |

Primary Examiner—Stephen J. Novosad
Attorney, Agent, or Firm—A. J. McKillop; C. J. Speciale; C. A. Malone

[57] ABSTRACT

A sand consolidation method is provided for use in a borehole having an unconsolidated or loosely consolidated oil or gas reservoir which is likely to introduce substantial amounts of sand into the borehole and cause caving. After perforating the borehole's casing at an interval of the formation where sand will be produced, an aqueous silicate solution is injected into said interval. Next, a spacer volume of a water-immiscible hydrocarbonaceous liquid is introduced into the interval. Thereafter, a water-miscible organic solvent containing an alkylpolysilicate is injected into the interval. A permeability retaining silica cement is formed in the interval. Injection of the aqueous silicate and organic solvent containing an alkylpolysilicate is continued until the interval has been consolidated by the silica cement to an extent sufficient to prevent sand migration and thereby prevent caving.

24 Claims, 1 Drawing Sheet

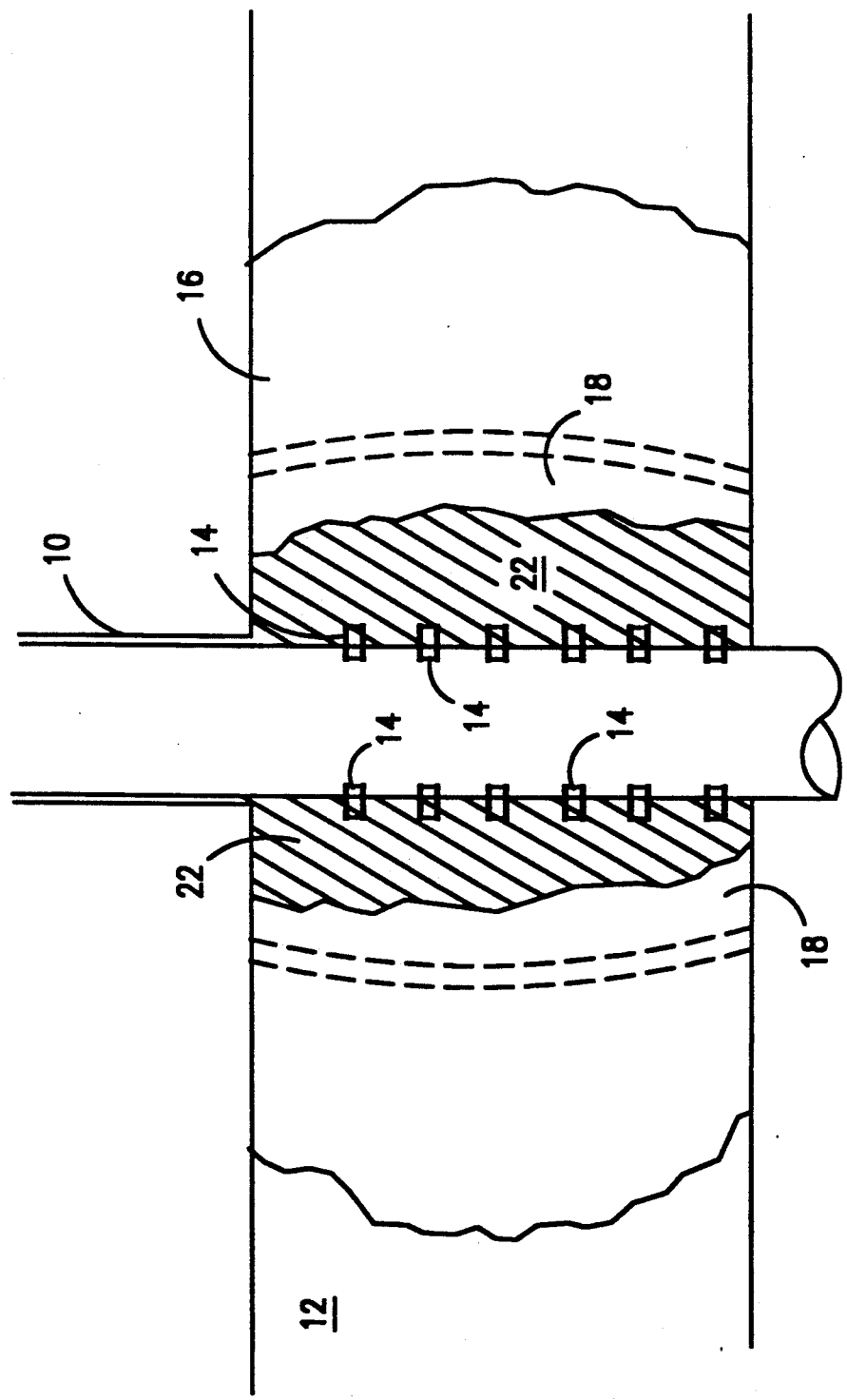

CONSOLIDATION AGENT AND METHOD

FIELD OF THE INVENTION

This invention relates to the consolidation of subterranean formations and, more particularly, to a method of introducing two consolidating fluids into a zone of an incompetent formation so as to form a silica cement adjacent to a well penetrating the formation. The method of this invention is especially useful in promoting more uniform fluid injection patterns in a consolidated interval of the formation so as to tolerate high temperature steam when conducting a steam-flooding or fire-flooding enhanced oil recovery operation.

BACKGROUND OF THE INVENTION

It is well known in the art that wells in sandy, oil-bearing formations are frequently difficult to operate because the sand in the formation is poorly consolidated and tends to flow into the well with the oil. This "sand production" is a serious problem because the sand causes erosion and premature wearing out of the pumping equipment, and is a nuisance to remove from the oil at a later point in the production operation.

In some wells, particularly in the Saskatchewan area of Canada, oil with sand suspended therein must be pumped into large tanks for storage so that sand can settle out. Frequently, the oil can then only be removed from the upper half of the tank because the lower half of the tank is full of sand. This, too, must be removed at some time and pumped out. Moreover, fine sand is not always removed by this method and this causes substantial problems later in production operations which can lead to rejection of sand-bearing oil by the pipeline operator.

Also, removal of oil from tar sand formations is particularly challenging because high temperature steam is used. A suitable consolidating agent must withstand a similar harsh environment. In order to prevent caving around a wellbore and damage thereto, during the production of oil from a tar sand formation, it is often necessary to consolidate the formation.

Steam or fire stimulation recovery techniques are used to increase production from viscous oil-bearing formations. In steam stimulation techniques, steam is used to heat a section of the formation adjacent to a wellbore so that production rates are increased through lowered oil viscosities.

In a typical conventional steam stimulation injection cycle, steam is injected into a desired section of a reservoir or formation. A shut-in or soak phase may follow, in which thermal energy diffuses through the formation. A production phase follows in which oil is produced until oil production rates decrease to an uneconomical amount. Subsequently, injection cycles are often used to increase recovery. During the production phase, sand flowing from a subsurface formation may leave therein a cavity which may result in caving of the formation and collapse of the casing.

Caving of the formation and collapsing of the casing is not peculiar to the production of oil from a reservoir by steam stimulation. It may also occur during a water-flooding, fire-flooding, or carbon dioxide stimulation oil recovery operation.

Therefore, what is needed is a method to consolidate a formation so as to prevent caving of an interval near the wellbore which interval requires stability to withstand temperatures generated during a steam stimulation or thermal oil recovery process. Similarly, prevention of caving is also required during a water-flooding or carbon dioxide stimulation operation to recover oil from a reservoir.

SUMMARY OF THE INVENTION

This invention is directed to a method for consolidating sand in an unconsolidated or loosely consolidated oil or hydrocarbonaceous fluid-containing formation or reservoir. In the practice of this invention, an aqueous organoammonium silicate, alkali metal or ammonium silicate solution is injected into an interval of the formation where sand consolidation is desired. The aqueous silicate solution enters the interval through perforations made in a cased well penetrating the formation. By use of a mechanical packer, penetration of the fluid into the interval can be controlled. As the aqueous silicate enters the interval, it saturates said interval.

Thereafter, a spacer volume of a water-immiscible hydrocarbonaceous liquid is directed into the interval. Hydrocarbonaceous liquids for use herein comprise paraffinic and aromatic liquids. Paraffinic liquids are preferred. Preferred paraffinic liquids are selected from a member of the group consisting of mineral oils, naphthas, $C_5$–$C_{40}$ alkanes and mixtures thereof.

After a desired spacer volume of hydrocarbonaceous liquid has been placed into the interval requiring sand consolidation, a water-miscible organic solvent containing an alkylpolysilicate is next injected into the interval. Upon coming into contact with the organoammonium silicate, alkali metal or ammonium silicate solution which remains on the sand grains and between the sand grain contact points, alkylpolysilicate reacts with the organoammonium silicate, alkali metal or ammonium silicate to form silica cement in the interval being treated. The silica cement which is formed is stable at pH's of 7 or less and temperatures in excess of about 1,000° C. (1,832° F.). These steps can be repeated until the interval has been consolidated to the extent desired.

Once the treated interval has been consolidated to a desired strength, an enhanced oil recovery method can be used to produce hydrocarbonaceous fluids to the surface. EOR methods which can be utilized include water-flooding, steam-flooding, carbon dioxide stimulation, or fire-flooding. By controlling the concentration and rate of injection of the aqueous organoammonium silicate, alkali metal or ammonium silicate and the organic solvent containing the alkylpolysilicate which are injected into the interval being treated, the consolidation strength of the formation can be tailored as desired.

It is therefore an object of this invention to provide for an in-situ silica composition for consolidating an interval of a formation which composition is more natural to a formation's environment.

It is another object of this invention to provide for a composition which will ensure an even flow front and a homogeneous consolidation of an interval of a formation requiring treatment.

It is yet another object of this invention to consolidate an unconsolidated or loosely consolidated interval in a formation to prevent caving and damage to an adjacent wellbore.

It is a still yet further object of this invention to provide for a method to obtain a desired consolidation within an interval of a formation which can be reversed by treating the interval with a strong alkali.

It is an even still yet further object of this invention to provide for a formation consolidation agent which is resistant to high temperatures and low pH's.

It is yet an even still further object of this invention to provide for a consolidation composition lacking a particulate matter therein which matter might prevent penetration of the composition in an area requiring consolidation, flow alteration, or pore size reduction.

BRIEF DESCRIPTION OF THE DRAWING

The drawing is a schematic representation showing how the composition is injected into the formation so as to consolidate sand grains while maintaining the porosity of the formation.

DESCRIPTION OF THE PREFERRED EMBODIMENT

In the practice of this invention, as shown in the drawing, an aqueous organoammonium silicate, alkali metal or ammonium silicate slug is injected into well 10 where it enters formation 12 via perforations 14. A method for perforating a wellbore is disclosed in U.S. Pat. No. 3,437,143 which issued to Cook on Apr. 8, 1969. This patent is hereby incorporated by reference herein. As the aqueous slug containing the organoammonium silicate, alkali metal or ammonium silicate proceeds through formation 12, it fills the pores in the formation.

As the aqueous organoammonium silicate, alkali metal or ammonium silicate solution proceeds through zone 12, it deposits a film of said aqueous silicate on sand grains therein. This aqueous silicate also fills intersitial spaces between the sand grains. A spacer volume of a water-immiscible hydrocarbonaceous liquid 16 is directed through zone 12 so as to remove excess aqueous silicate from the intersitial spaces while leaving sufficient aqueous silicate adhering filmwise to the sand grains. The hydrocarbonaceous liquid comprises paraffinic and aromatic hydrocarbons.

This spacer volume of water-immiscible hydrocarbonaceous liquid 16 is selected from a member of the group consisting of mineral oils, naphthas, $C_5$–$C_{40}$ alkanes and mixtures thereof. Hydrocarbonaceous liquid used as a spacer volume can be of an industrial grade. A spacer volume of hydrocarbonaceous liquid is used to remove excess aqueous silicate from between the sand grains while allowing a thin silicate film to remain on the surface to obtain a cementing reaction with a subsequently injected water-miscible organic solvent containing an alkylpolysilicate.

Afterwards, a water-miscible organic solvent containing an alkylpolysilicate soluble therein is injected into formation 12 where it forms in-situ a permeability retentive silica cement which is stable to temperatures up to and in excess of about 1,000° C. (1,832° F.). Once the silica cement has hardened and formation 12 has been consolidated to the extent desired, by repeated applications if necessary, an EOR operation is initiated in formation 12.

The cementing reaction which takes place binds sand grains in the formation thereby forming a consolidated porous zone 22. Although the sand grains are consolidated, a cement is formed which results in a substantially high retention of the formation's permeability.

In order to increase the cement's consolidation strength, the concentration of the organoammonium silicate, alkali metal silicate or ammonium silicate contained in an aqueous slug or the alkylpolysilicate contained in the organic solvent slug can be increased. Similarly, the flow rates of each of these slugs through the formation can be decreased to obtain better consolidation strength. A decreased flow rate is particularly beneficial for increasing the consolidation strength when the alkylpolysilicate slug's flow rate is decreased. As will be understood by those skilled in the art, optimal concentrations and flow rates are formation dependent. Therefore, optimal concentrations and flow rates should be geared to field conditions and requirements.

Injection of aqueous organoammonium silicate, alkali metal or ammonium silicate slug and organic solvent slug 18 containing the alkylpolysilicate can be continued until the formation has been consolidated to a strength sufficient to prevent caving and damage to the wellbore. As will be understood by those skilled in the art, the amount of components utilized is formation dependent and may vary from formation to formation. Core samples obtained from the interval to be treated can be tested to determine the required pore size and amount of cement needed. U.S. Pat. No. 4,549,608 which issued to Stowe et al. teaches a method of sand control where clay particles are stabilized along a face of a fracture. This patent is incorporated by reference herein.

After an interval of the formation has been consolidated, that interval or another adjacent to the wellbore can be perforated and enhanced oil recovery method conducted therein. Steam-flooding processes which can be utilized when enhancing this sand consolidation process described herein are detailed in U.S. Pat. Nos. 4,489,783 and 3,918,521 which issued to Shu and Snavely, respectively. U.S. Pat. No. 4,479,894 that issued to Chen et al. describes a water-flooding process which may be used herein. Fire-flooding processes which can be utilized herein are disclosed in U.S. Pat. Nos. 4,440,227 and 4,669,542 which issued to Holmes and Venkatesan, respectively. These patents are hereby incorporated by reference herein.

A carbon dioxide EOR process which can be used after consolidating the higher permeability zone is disclosed in U.S. Pat. No. 4,513,821 which issued to W. R. Shu on Apr. 30, 1985. This patent is hereby incorporated by reference herein.

Organoammonium silicate, ammonium or alkali metal silicates having a $SiO_2/M_2O$ molar ratio of about 0.5 to about 4 are suitable for forming a stable alkali silicate cement. The metal (M) which is utilized herein comprises sodium, potassium, or lithium. Preferably, the $SiO_2/M_2O$ molar ratio is in the range of about greater than 2. The concentration of the silicate solution is about 10 to about 60 wt. percent, preferably 20 to about 50 wt. percent. As will be understood by those skilled in the art, the exact concentration should be determined for each application. In general, concentrated silicate solutions are more viscous and form a stronger consolidation due to a higher content of solids.

In those cases where it is not possible to control the viscosity of the silicate solution and preclude entry into a lower permeability zone, a mechanical packer may be used. The silica cement which is formed can withstand pH's of 7 or less and temperatures up to and in excess of about 1,000° C. (1,832° F.). The preferred silicates are sodium, lithium and potassium. Potassium is preferred over sodium silicate because of its lower viscosity. Fumed silica, colloidal silica, or other alkali metal hydroxides can be added to modify the $SiO_2/M_2O$ molar ratio of commercial silicate. Colloidal silicate can be used alone or suspended in alkali metal or ammonium silicate as a means of modifying silicate content, pH, and/or $SiO_2$ content.

Organoammonium silicates which can be used in an aqueous solution include those that contain $C_1$ through $C_8$ alkyl or aryl groups and hetero atoms. Tetramethylammonium silicate is preferred.

Alkylpolysilicate (EPS) contained in the water-miscible organic solvent is the hydrolysis-condensation product of alkylorthosilicate according to the reaction equation below:

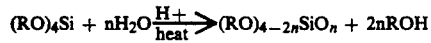

where
$n \leq 2$
$R = C_1 - C_{10}$
R should be $\leq 10$ carbons for good solubility and high $SiO_2$ content.

Tetramethyl (TMS) or tetraethylorthosilicates (TEOS) are preferred. Mixed alkylorthosilicate can also be used. It is desirable to obtain an alkylpolysilicate with $n > 0.5$, preferably n greater than 1. As n increases, the $SiO_2$ content increases, resulting in stronger consolidation. It is desirable to use an alkylpolysilicate with a silica content of 30% or more, preferably about 50%. EPS which is used herein is placed into a water-miscible organic solvent. The preferred solvent is ethanol. Of course, other alcohols can be used. EPS, TMS, TEOS, or other alkylpolysilicates are contained in the solvent in an amount of from about 10 to about 90 weight percent sufficient to react with the silicates contained in the aqueous solution. Although alcohol is the solvent preferred because of its versatility and availability, other water-miscible organic solvents can be utilized. These solvents include methanol and higher alcohols, glycols, ketones, tetrahydrofuran (THF), and dimethyl sulfoxide (DMSO).

Although ethanol is the preferred solvent, higher alcohols also can be utilized, as well as other solvents capable of dissolving alkylpolysilicates. The concentration of alkylpolysilicate should be in the range of about 10 to about 100 wt. percent, preferably 20 to about 80 wt. percent. Of course, enough alkylpolysilicate should be used to complete the reaction with the alkali metal or ammonium silicate.

Although the present invention has been described with preferred embodiments, it is to be understood that modifications and variations may be resorted to without departing from the spirit and scope of this invention, as those skilled in the art readily understand. Such variations and modifications are considered to be within the purview and scope of the appended claims.

What is claimed:

1. A sand consolidating method for an unconsolidated or loosely consolidated formation comprising:
   a) perforating a cased borehole at an interval expected to produce fines or sand when producing hydrocarbonaceous fluids from said interval;
   b) injecting an aqueous solution of a silicate into said interval through perforations contained in the borehole which solution is of a strength sufficient to react with an organic solvent solution of alkylpolysilicate to form a permeability retention cement where said silicate is selected from a member of the group consisting of alkali metal silicate, organoammonium silicate, or ammonium silicate;
   c) injecting thereafter a spacer volume of a water-immiscible hydrocarbonaceous liquid into said zone;
   d) injecting thereafter a water-miscible organic solvent containing an alkylpolysilicate into said interval in an amount sufficient to react with the aqueous silicate so as to form a silica cement with permeability retention characteristics whereupon the interval is consolidated in a manner sufficient to prevent formation sand from being produced from the formation during the production of hydrocarbonaceous fluids.

2. The method as recited in claim 1 where the alkali metal silicate comprises ions of sodium, potassium, or lithium, and mixtures thereof.

3. The method as recited in claim 1 where the alkali metal silicate has a silicon dioxide to metal oxide molar ratio of greater than about 2.

4. The method as recited in claim 1 where said alkylpolysilicate comprises tetramethyl or ethylorthosilicates.

5. The method as recited in claim 1 where in step d) the water-miscible organic solvent is a member selected from the group consisting of methanol, ethanol, higher alcohols, glycols, ketones, tetrahydrofuran, and dimethyl sulfoxide.

6. The method as recited in claim 1 where the silicate is contained in the aqueous solution in an amount of from about 10 to about 60 weight percent.

7. The method as recited in claim 1 where alkylpolysilicate is contained in said organic solvent solution in an amount of about 10 to about 100 weight percent.

8. The method as recited in claim 1 where in step d) said alkylpolysilicate is a hydrolysis-condensation product of alkylorthosilicate according to the equation below:

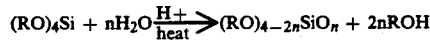

where $n \leq 2$ and $R = C_1 - C_{10}$.

9. The method as recited in claim 1 where said silica cement withstands temperatures in excess of about 1,000° C. (1,832° F.).

10. The method as recited in claim 1 where the silica cement withstands a temperature in excess of about 1,000° C. (1,832° F.) and a pH of about 7 or less.

11. The method as recited in claim 1 where the silicon dioxide to metal oxide molar ratio is greater than about 2.

12. The method as recited in claim 1 where said organoammonium silicate comprises $C_1$ throu $C_{10}$ alkyl or aryl groups and hetero atoms.

13. A composition for consolidating an interval of an unconsolidated or loosely consolidated formation comprising:
   a) an aqueous solution of a silicate selected from a member of the group consisting of an alkali metal silicate, ammonium silicate or organoammonium silicate;
   b) a spacer volume of a water-immiscible hydrocarbonaceous liquid; and
   c) a water-miscible organic solvent containing an alkylpolysilicate in an amount sufficient to react with said organoammonium silicate, alkali metal or ammonium silicate so as to form a permeability retentive silica cement within an interval of an underground formation of a strength sufficient to bind silica-containing particles within a formation and preclude formation sand from being produced from said interval thereby preventing caving.

14. The composition as recited in claim 13 where the alkali metal silicate comprises ions of sodium, potassium, or lithium, and mixtures thereof.

15. The composition as recited in claim 13 where the alkali metal silicate has a silicon dioxide to metal oxide molar ratio of greater than about 2.

16. The composition as recited in claim 13 where said alkylpolysilicate comprises tetramethyl or tetraethylorthosilicates.

17. The composition as recited in claim 13 where in step c) the water-miscible organic solvent comprises methanol, ethanol, higher alcohols, glycols, ketones, tetrahydrofuran, and dimethyl sulfoxide.

18. The composition as recited in claim 13 where the alkali metal or ammonium silicate is contained in the solution in an amount of from about 10 to about 60 weight percent.

19. The composition as recited in claim 13 where the alkylpolysilicate is contained in said solution in an amount of about 10 to about 80 weight percent.

20. The composition as recited in claim 13 where said silica cement withstands temperatures in excess of about 1,000° C. (1,832° F.).

21. The composition as recited in claim 13 where the silica cement withstands a temperature in excess of about 1,000° C. (1,832° F.) and a pH of about 7 or less.

22. The composition as recited in claim 13 where in step c) said alkylpolysilicate is a hydrolysis-condensation product of alkylorthosilicate according to the equation below:

where $n \leq 2$ and $R = C_1 - C_{10}$.

23. The method as recited in claim 1 where in step c) said hydrocarbonaceous liquid is selected from a member of the group consisting of methanol, higher alcohols, glycols, ketones, tetrahydrofuran, and dimethyl sulfoxide.

24. The method as recited in claim 13 where in step b) said hydrocarbonaceous liquid is selected from a member of the group consisting of methanol, higher alcohols, glycols, ketones, tetrahydrofuran, and dimethyl sulfoxide.

* * * * *